United States Patent [19]

Schon

[11] Patent Number: 5,596,772
[45] Date of Patent: Jan. 28, 1997

[54] TOILET FLUSHING SYSTEM WITH MULTI-DIAPHRAGM STORAGE CONTAINER HAVING THREE FLUID RECEIVING CHAMBERS

[75] Inventor: Otmar Schon, Bexbach-Hochen, Germany

[73] Assignee: Hydac Technology GmbH, Sulzbach/Saar, Germany

[21] Appl. No.: 360,718

[22] PCT Filed: Jul. 2, 1993

[86] PCT No.: PCT/EP93/01708

§ 371 Date: Dec. 19, 1994

§ 102(e) Date: Dec. 19, 1994

[87] PCT Pub. No.: WO94/01680

PCT Pub. Date: Jan. 20, 1994

[30] Foreign Application Priority Data

Jul. 9, 1992 [DE] Germany .................. 42 22 502.7

[51] Int. Cl.⁶ ............................................ E03D 3/10
[52] U.S. Cl. ......................... 4/361; 4/354; 4/362
[58] Field of Search ........................... 4/334–337, 354, 4/361, 362; 138/30

[56] References Cited

U.S. PATENT DOCUMENTS

| | | | |
|---|---|---|---|
| 852,150 | 4/1907 | Whitney | 138/30 X |
| 2,383,180 | 8/1945 | Ellinwood | 138/30 X |
| 2,540,676 | 2/1951 | Johnson et al. | 138/30 |
| 2,638,932 | 5/1953 | Alexander | 138/30 |
| 2,793,793 | 5/1957 | Sampson | 4/354 |
| 3,029,443 | 4/1962 | Naccarato | 4/362 |
| 4,707,868 | 11/1987 | Hennessy | 4/362 |

FOREIGN PATENT DOCUMENTS

| | | |
|---|---|---|
| 0666221 | 11/1965 | Belgium . |
| 0947655 | 7/1949 | France . |
| 2529290 | 12/1983 | France . |
| 1525730 | 1/1970 | Germany . |
| 3021829 | 12/1981 | Germany . |
| 1108551 | 4/1968 | United Kingdom . |
| 1158436 | 7/1969 | United Kingdom . |

*Primary Examiner*—Robert M. Fetsuga
*Attorney, Agent, or Firm*—Roylance, Abrams, Berdo & Goodman, L.L.P.

[57] ABSTRACT

A toilet flushing system includes a fresh water feed, a fluid storage container connected to the fresh water feed, and a supply line coupled to the storage container and a toilet. The fluid storage container has a container casing and first and second separating diaphragms within the casing. The separating diaphragms define first, second and third partial chambers within the container casing for separately receiving gas and fresh water. The second partial chamber is defined between the separating diaphragms and receives gas. A valve in the fresh water feed and the supply line, closes the fresh water feed and the supply line. The valve is movable between a first switch position for filling the partial chamber with fresh water to be delivered to the toilet and a second switch position in which the third partial chamber simultaneously is filled with a medium.

9 Claims, 3 Drawing Sheets

TOILET FLUSHING SYSTEM WITH MULTI-DIAPHRAGM STORAGE CONTAINER HAVING THREE FLUID RECEIVING CHAMBERS

FIELD OF THE INVENTION

The present invention relates to a toilet flushing system to reduce the use of fresh water in toilets, with a fresh water feed which can be closed off by a valve arrangement. The fresh water feed is connected to a fluid storage container filled with fresh water. The fresh water can be delivered to the toilet through a supply line which can be closed off by the valve arrangement. The system has a storage container casing, in which two partial chambers are formed by a separating diaphragm for receiving and holding gas and fresh water separately from one another.

BACKGROUND OF THE INVENTION

In a toilet flushing system disclosed in German A-26 34 248, a fluid or pressure container with only one diaphragm is attached on the fluid side to a cold- and warm-water fresh water feed for filling with fresh water. The fresh water feed delivers fresh water to a sanitary device with the suitable control setting of the valve arrangement for a flushing or cleansing process. The gas side of the fluid storage container is separated from the fluid side by the elastic or flexible separating diaphragm made of plastic or rubber. The gas cushion of nitrogen or air with a pre-formed bias is present. In a flushing process, the gas cushion delivers the pre-bias pressure to the fluid side, so that the flushing process is induced with high pressure and affords at least identical good cleansing results, as compared with conventional toilet flushing systems, while requiring only a relatively small fresh water volume.

Despite the advantage of the reduction of fresh water required with this known toilet flushing device, pressure surges or peaks occur because of water pressure deviations in the system, which lie below static pressure. The pressure surges or peaks lead to pressure deviations at the end of the flushing process, so that the desired and basic cleansing can no longer be guaranteed, especially with still further reduced flushing water volume. Short filling times, without transmission of pressure points in the water system, when using the known toilet flushing system cannot be attained. Therefore, a structurally larger fluid storage container is required for production of the pre-biasing over the separating diaphragm by means of the gas cushion. This requirement opposes space-saving assembly and construction in toilet flushing systems.

In the toilet flushing system disclosed in German A-35 36 967, a liquid storage container is configured as a cylinder and has a movable piston within it subdividing the cylindrical container into two liquid chambers which can be filled with fresh water. The piston moves back and forth under normal ambient pressure for a flushing cycle. Two flushing processes take place with the same water volume. With the thrusting of one partial water volume out of the cylinder by the piston, the other partial chamber of the cylinder is simultaneously filled with water. When the flushing cycle includes two timed sequential flushing processes, a partial volume of the flushing water is fed to the flushing device during each operation, and improved flushing results are attained. At the same time, with reduced structural size of the flushing assembly in the form of the cylinder with piston, however, a great additional volume of fresh water is required because of the two-cycle flushing cycle.

In the toilet flushing system disclosed in European Patent -A-O 430 521, an elastically flexible diaphragm is blown up in the manner of a balloon to produce the flushing pressure required for a flushing process. Fresh water is fed from the diaphragm bubble into the balloon. For the purpose of a flushing process, the balloon stands under the pressure arising upon contraction of the elastic diaphragm bubble. The bubble again discharges the volumes of fresh water contained therein. In another embodiment of this known toilet flushing system, pre-biasing is attained by a pressure spring which is released abruptly during initiation of a flushing process. Under the spring bias, a piston moves in a cylinder, and drives the water volume previously stored in the cylinder to initiate the flushing process. This known toilet flushing system has a complicated construction, and thus, is expensive to manufacture. In addition, the pre-biasing which can be obtained by the diaphragm bubble and pressure spring is not sufficient to produce sufficiently high flushing pressure for a good cleansing result with a minimum volume of water.

A fluid storage container with a storage container casing subdivided by two separating diaphragms into three partial chambers, in which the one partial chamber is defined by the two separating diaphragms and serves to hold gas and the other two partial chambers are provided to hold a fluid in the form of water or hydraulic oil, is known by experts in many embodiments (German A-1 525 730, German A-3 021 829 and Belgian A-666 221). These known fluid storage containers represent a type of pressure expansion or compensation vessel. The incorporated gas pressure cushion provides pressure and/or temperature compensation in the fluid circuit to which the relevant fluid storage container is connected by its two fluid chambers arranged at the ends. Furthermore, pulses occurring in the fluid system can be attenuated. In another type of known fluid storage container with two separating diaphragms (France A-2 529 290), a volume of fluid guided between the two separating diaphragms is driven by pulse-like application of simultaneous gas pressure surges or peaks in the two other partial chambers. Such partial chambers are defined by the separating diaphragms. This type of fluid storage container represents a type of fluid pump which can transport the fluid especially gently and by pulsing.

SUMMARY OF THE INVENTION

An object of the present invention is to provide a toilet flushing system for reducing the fresh water use in toilets.

Another object of the present invention is to provide a toilet flushing system providing good cleansing results with a low volume of fresh water.

A further object of the present invention is to provide a toilet flushing system which can attain short flushing times at high pressure.

The foregoing objects are basically obtained by a toilet flushing system comprising a fresh water feed, a fluid storage container connected to the fresh water feed, and a supply line coupled to the storage container and a toilet. The fluid storage container has a container casing and first and second separating diaphragms within the casing. The separating diaphragms define first, second and third partial chambers within the container casing for separately receiving gas and fresh water. The second partial chamber is defined between the separating diaphragms and receives gas.

A valve means, in the fresh water feed and the supply line, closes the fresh water feed and the supply line. The valve means is movable between a first switch position for filling the partial chamber with fresh water to be delivered to the toilet and a second switch position in which the third partial chamber simultaneously is filled with a medium.

The additional separating diaphragm is arranged in the storage container casing to define one more partial chamber to receive at least one medium. The partial chamber defined by the two separating diaphragms serves to receive and hold the gas. In one switch setting of the valve arrangement one partial chamber can be filled with fresh water. The fresh water can be delivered to the toilet in another switch setting. In the other switch setting, the additional partial chamber simultaneously receives the relevant medium. All of the pressure peaks or surges which arise because of water pressure deviations and pressure deviations at the end of the flushing process are avoided. Thus, short filling times without negative transmission of pressure points in the water system are attained by the present invention. Despite a relatively small gas volume in the storage container, the gas pressure does not drop below the fluid pressure and the gas pressure of the storage container during the entire flushing process is greater than the pressure in an identical storage container with only one diaphragm. Thus, short flushing times at high pressure can be attained with only small volumes of fresh water required. This is favorable to the environment.

The multi-chamber fluid storage container can produce or store energy in a better manner than a conventional storage container with only one diaphragm of identical structural size. Dependent upon the predeterminable volume of gaseous medium within the chamber between the two separating diaphragms and the pressure variation in the system, a precise setting or dosing of the fluid volume to be delivered out of the fluid storage container is guaranteed, as compared with the solutions known until this time.

With one preferred embodiment of the system according to the present invention, the medium to be stored in the other partial chamber is fresh water out of the fresh water feed line, compressed air from a compressed air device or fluid conveyed from a fluid pump, especially hydraulic oil. If the two partial chambers are filled with fresh water alternately, these volumes are always ready for a new flushing process. If desired, a plurality of flushing processes can be carried out directly one after the other. If the other partial chamber is filled with compressed air or with hydraulic oil, the pressure in the toilet flushing system can be still further increased by use of the fluid storage container, so that a good cleansing result can still be attained with even a small fresh water volume.

With another preferred embodiment the separating diaphragm is configured as a shell and is connected by a seal with its longitudinal border around the periphery with the storage container casing. The separating diaphragm is fastened securely by this means in the storage container casing, so that it withstands even sudden impact stresses.

In another preferred embodiment of the fluid storage container of the present invention, fluid-carrying lines open at one end of the storage container casing into the fluid-carrying partial chambers. At the other end of the storage container casing, each chamber is attached through a ventilation line to a respective fluid-carrying line. With horizontal construction, the storage container is assured of complete emptying through the fluid-carrying lines mounted at a lower level. Accumulation of gas carried along in the fluid or gaseous media in the fluid-carrying chambers is precluded because of the ventilation lines, preferably of narrow cross section. The air carried along during the filling process to fill the fluid storage container with fluid is carried away at the beginning of each fluid delivery to the fluid-carrying lines through the relevant ventilation line and consequently is discharged from the fluid storage container.

In one especially preferred embodiment of the fluid storage container, a rigid partition or separating layer with apertures is located between the separating diaphragms and the storage container casing. With this arrangement, discharge of any gas or gaseous media found in the fluid in the storage container is possible in and of itself at any desired point in the system, without incurring operation limitations. Furthermore, a complete emptying of the container can be attained at any desired structural point and with any desired arrangement of the discharge opening.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
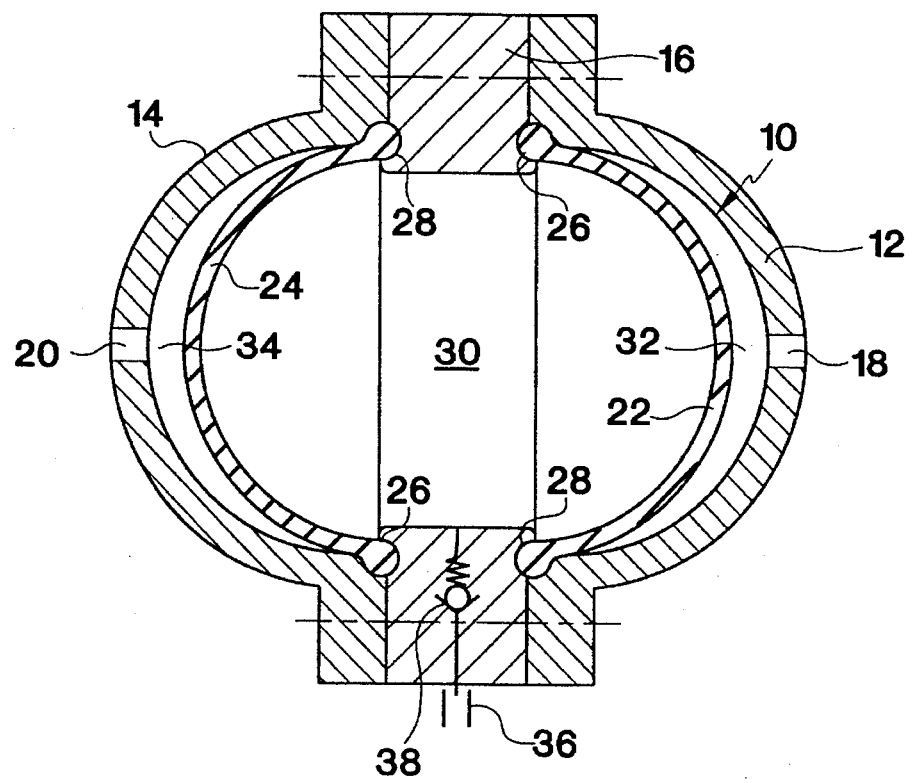
FIG. 1 is a side elevational view in section of a fluid storage container according to a first embodiment of the present invention.

The fluid storage container illustrated in FIG. 1 has a storage container casing 10. Casing 10 is formed essentially of two shell-like halves 12 and 14, connected tightly with one another by means of a middle ring 16. To produce this tight connection, tie rods engage through and along the two flange-like ends of the halves 12 and 14, as well as middle ring 16, as shown with broken lines in FIG. 1. In the side walls of the shell-like halves 12 and 14, two apertures 18 and 20 face one another at the same height.

Within storage container casing 10, two shell-like separating diaphragms 22 and 24 are arranged opposite one another. The diaphragms are connected tightly or sealed with their beaded longitudinal border 26 around the periphery with storage container casing 10. The longitudinal borders 26 are tightly clamped in radial cutouts 28 of middle ring 16 with the flanged ends of halves 12 and 14. The two separating diaphragms 22 and 24 define an inner partial chamber 30 therebetween. With the adjacent facing inner periphery of the respective shell half 12 or 14 of storage container casing 10, an outside partial chamber 32, 34 is defined. Separating diaphragms 22, 24 are formed of a conventional material for fluid storage containers, especially of flexible rubber material, to separate the partial chambers 30, 32, 34 with a liquid-tight and gas-tight seal from one another. The diaphragms can also be fastened in other manners, for instance by means of a clamp connection applied to a fastening and centering ring.

The two separating diaphragms 22 and 24 can be connected directly with one another along their borders 26, and close off the distance between the two separating diaphragms 22 and 24 by fitting tightly together, so that a sort of storage container bubble (not shown) is formed. Such bubble is connected by sealing along its outside periphery with storage container casing 10. Dependent upon the intended use and the circumstances of use of the fluid storage container, the relevant partial chambers 30, 32 and 34 are provided to receive either a fluid or a gas. For filling of a gas or fluid into inner partial chamber 30, which is surrounded by the two separating diaphragms 22 and 24, a connector fixture 36 is provided with spring-biased check valve 38. The check valve precludes any unintended reverse flow out of partial chamber 30 through connector fixture 36.

Figure 4:
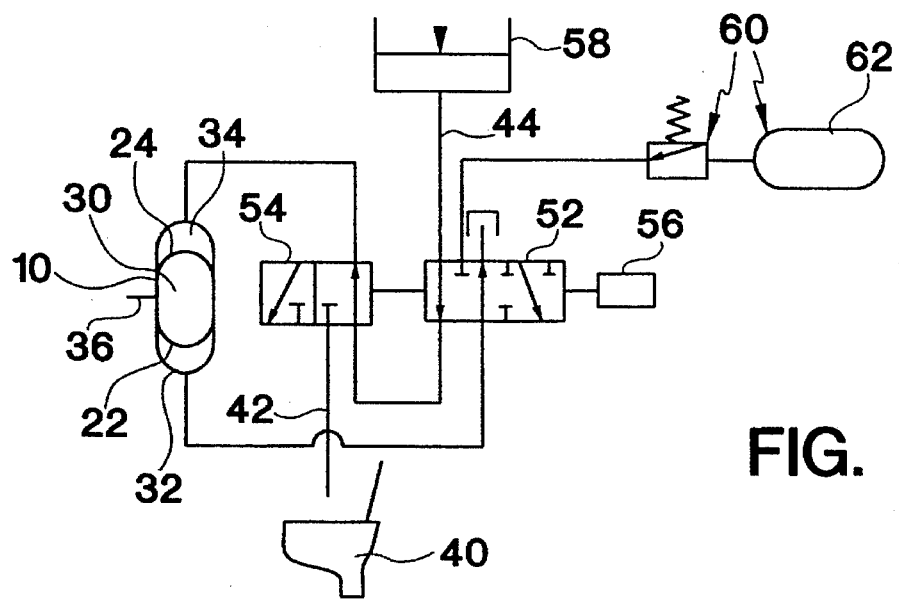
FIG. 4 is a schematic diagram with a fluid storage container operated by compressed air and connected to a toilet flushing circuit according to the present invention.
Figure 5:
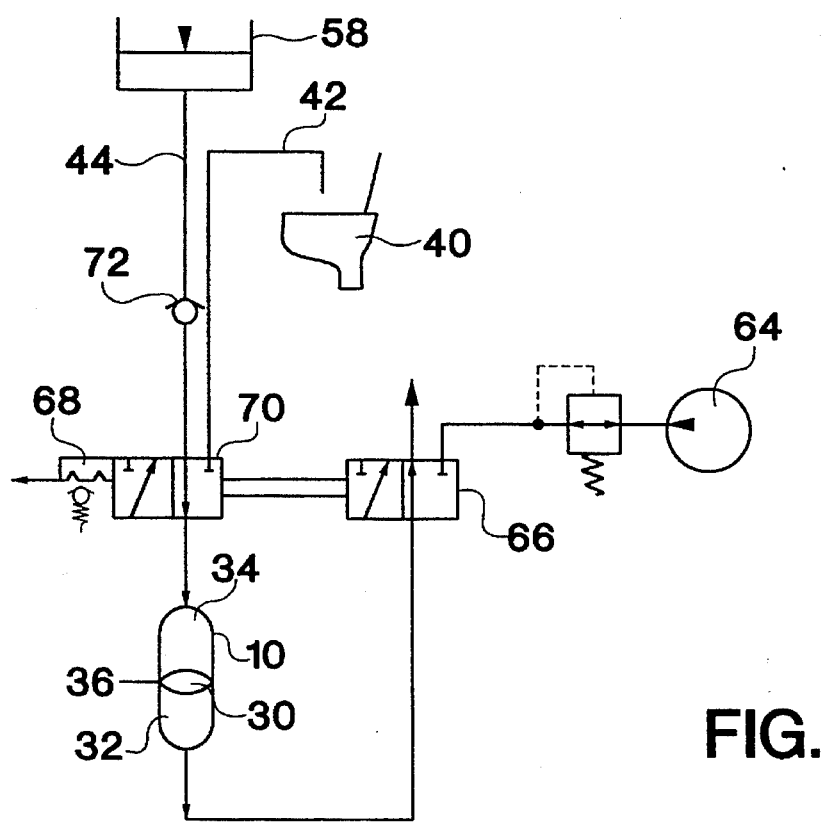
FIG. 5 is a schematic diagram with a fluid storage container operated by hydraulic oil pressure and connected to a toilet flushing circuit according to the present invention.
Figure 3:
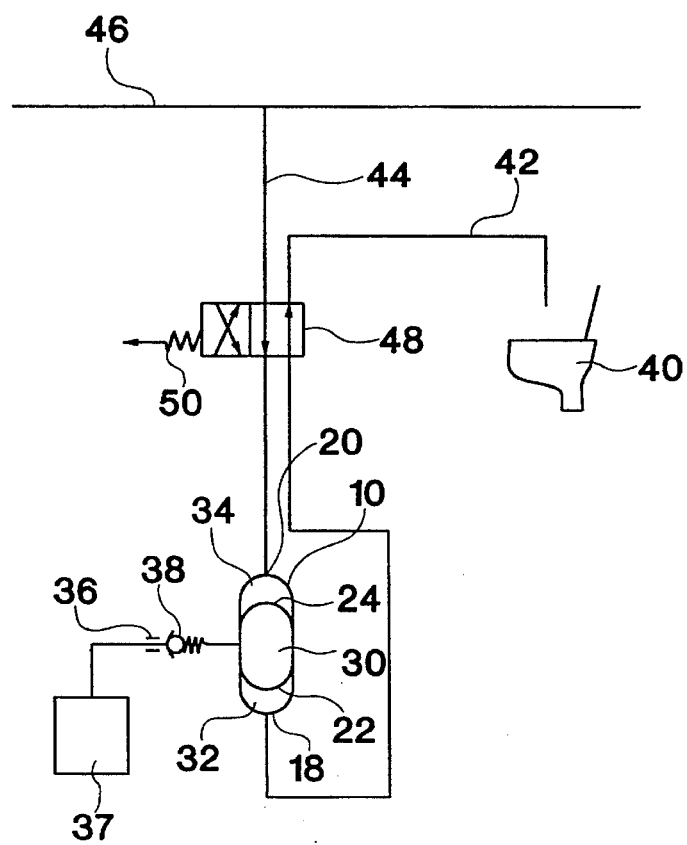
FIG. 3 is a schematic diagram with a fluid storage container according to the present invention connected to a stationary water system.

The storage container shown in FIG. 1 can be used in the systems of FIGS. 3 to 5, including a sanitary device in the form of a toilet 40. To feed a volume of fresh water into the toilet, toilet 40 is connected to a supply line 42 which can be closed off. In this style of supply line all embodiments of a toilet flushing system have a fresh water feed 44 which can be closed off. This fresh water feed 44 is connected to the fluid storage container as in FIG. 1.

In the embodiment shown in FIG. 3, the fresh water feed 44 is connected to the line 46 of a stationary water system. Between fresh water feed 44 and the fluid storage container, and between this container and supply line 42, a 4/2 valve 48 with a sort of ratchet 50 is connected. The fluid storage container which can also be indicated as multi-chamber storage container is arranged with its two separating diaphragms 22 and 24 in the system of FIG. 3 offset by 90 degrees in clockwise direction as compared with FIG. 1. Feed line 44 opens through top aperture 20 into top partial chamber 34. Supply line 42 opens into bottom partial chamber 32 through aperture 18. The assembly position of the storage container is not in any way limited to use in toilet flushing systems.

Middle partial chamber 30 is filled with a gaseous medium, (for example, air) through a gas valve in the form of check valve 38 from the outside through connector fixture 36 that is attached to a pressure medium source 37. The greater the pre-filling pressure in middle chamber 30, the smaller the possible filling volume of the diaphragm storage container with fresh water with the same system pressure. If very high pressure is used, it can be arranged that the flushing can be executed only when the toilet cover is closed and/or is locked in closed position. Also, a flushing process can be designed which is not initiated until the operator has left the room with the toilet. An adjustable gas valve (not shown), which according to the structure of the fluid storage container allows further variation of the volume in middle chamber 30 of the diaphragm storage container, can also be provided.

The device shown in FIG. 3 operates as follows. With the illustrated switch setting of valve 48, top chamber 34 of the diaphragm storage container is filled from the side with fresh water through fresh water feed 44, coming from line 46. Chamber 34 is enlarged and chambers 30 and 32 are reduced in size and volume. Once the top chamber 34 of the diaphragm storage container is filled with fresh water, then, by working through operating arrangement 50, valve 48 can be, for example, controlled by a foot pedal. Once the valve 48 is switched to its second position the volume of fresh water moves from line 46 through fresh water feed 44 through valve 48 and into bottom chamber 32 of the diaphragm storage container and fills this chamber. Since the valve 48 is now in its second position, the fresh water volume in top chamber 34 is forced under the effect of the gas pressure against separating diaphragms 22, 24, through valve 48 into supply line 42 and thus into toilet 40 for a flushing process. Since the valve 48 changes the direction of both the water feed 44 and the supply line 42, when the valve 48 is moved from one position to the other, the delivery of water from the top chamber 34 to the toilet and the filling of the bottom chamber 32 is simultaneous. (Likewise, the filling of top chamber 34 and the delivery of water from the bottom chamber 32 to the toilet is also simultaneous.) Following completion of the flushing process, chamber 32 is filled with fresh water, chamber 34 is emptied and the storage container is ready for a new flushing process when the valve 48 is switched back to its original position as illustrated in FIG. 3. If desired, several flushing processes can be carried out in direct sequence one after the other.

With use of the fluid storage container according to the present invention as dosing system in toilet flushing devices, all of the pressure peaks or surges which occur on the basis of water pressure deviations lie below static pressure and only slight pressure deviations occur at the end of the flushing process. Thus, short filling times without transmission of pressure peaks or surges can be attained in the system. Despite the relatively low gas volume of the storage container, the gas pressure does not drop below the hydraulic pressure. The gas pressure of the storage container during the entire flushing process is greater than the pressure normally found in a conventional storage container with only one diaphragm where the corresponding gas chamber is alternately pressurized and depressurized. The short flushing times attained presupposes a small volume of fresh water, which is also beneficial to the environment.

In the embodiment of a toilet flushing system of FIG. 4, the storage container is again arranged as in FIG. 1. For the closing off of fresh water feed 44 as well as supply line 42, this time a 5/2 valve 52 or else a 3/2 valve 54 is used. The two valves 52 and 54 can be operated synchronously through an electric or manual or foot-pedal operated switching arrangement 56. Supply line 44 for fresh water feed is connected to a storage container tank 58. A use-specific compressed air device 60 is present, whereby the compressed air can be stored in and supplied from a storage container 62. In the starting position shown in FIG. 4, the diaphragm storage container is connected through valves 52 and 54 as well as through fresh water feed 44 with storage tank 58, and is filled with fresh water through these devices.

If the switching arrangement 56 is now set in operation, compressed air passes from storage container 62 of compressed air device 60 into bottom chamber 32 of the storage container and forces or applies pressure to the volume of fresh water located in top chamber 34. The fresh water then passes from chamber 34 through valve 54 under pressure into toilet 40 for a flushing process. Following completion of the flushing process, valves 52 and 54 assume their starting positions shown in FIG. 4 once again, and a new fresh water filling process begins. A double reliability of the system is obtained in this manner.

A fluid pump 64 is used in the embodiment of FIG. 5. By means of pump 64, a fluid, for example, hydraulic oil, can be conveyed into bottom chamber 32 of the storage container when 3/2 valve 66 is set in the open or on setting. The diaphragm storage container is again configured the same as the storage container of FIG. 1. With the switch setting shown in FIG. 5, the storage container is filled by gravity. With switching of valve 66, a bias of the gas cushion takes place. When a predetermined maximum pressure is reached, valve 66 returns to its starting position and switching element 68 with its 3/2 valve 70 is released. The flushing process is initiated or terminated with switching of valve 70. Thereafter, valve 70 is brought back to its starting position and is locked in this position by means of operating device 68, so that a new filling of the storage container is initiated. With this cycle, optimum energy can be stored in the storage container, and then can be removed on short notice. A small pump 64 suffices for the biasing. Instead of a pump, the supply can also be assured through a connection to the mains or to a hydraulic system. To prevent reverse flow in the exemplary embodiment of FIG. 5, a check valve 72 is arranged between storage container 58 and valve 70. Instead of this multi-chamber diaphragm storage container, a bubble storage container can be used, having a diaphragm (not shown) on the border, mounted on the storage container casing, which then undertakes the function of separating diaphragms 22 and 24.

Figure 2:
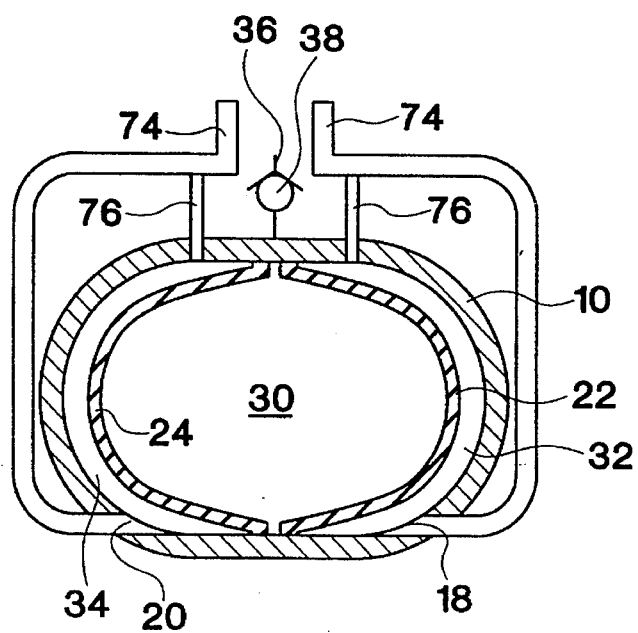
FIG. 2 is a side elevational view in section of a fluid storage container according to a second embodiment of the present invention.

FIG. 2 illustrates a further development of the storage container of FIG. 1. This modified embodiment is also used in toilet flushing systems. As shown in FIG. 2, apertures 18 and 20 in storage container casing 10 are located at a lower level. Fluid-carrying lines 74 open at this end of storage container casing 10 through apertures 18 and 20 into fluid-carrying partial chambers 32 and 34. At the other top end of storage container casing 10, partial chambers 32 and 34 are connected through ventilation lines 76 to lines 74 surrounding the storage container casing. In the present embodiment, connector fixture 36 with check valve 38 is arranged on top of the storage container. Line 74, seen at the right of FIG. 2, forms the actual flushing line, and can be connected to supply line 42 as in FIGS. 3–5. The other line 74 is connected as the feed line to fresh water feed 44.

With the fluid storage container shown in FIG. 2, partial chambers 32 and 34 can be completely emptied through lines 74. The ventilation lines 76 carry away the air which is borne with the water out of chambers 32 and 34. Thus, separating diaphragms 22 and 24 can be moved dependent upon the pressure ratios being generated in the storage container.

Figure 6:
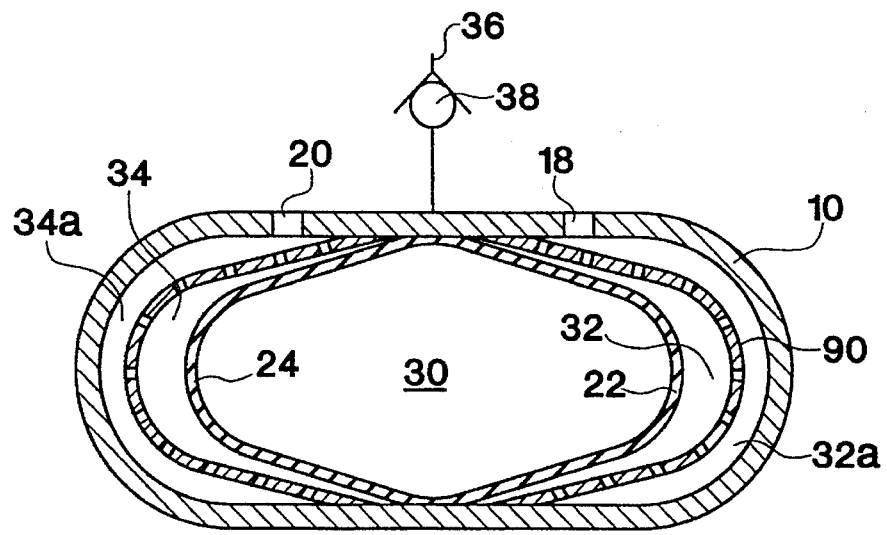
FIG. 6 is a side elevational view in section of a fluid storage container according to a third embodiment of the present invention.

FIG. 6 shows a fluid storage container in which flushing lines 74, as in the fluid storage container of FIG. 2 are integrated with the ventilation system through ventilation lines 76 in storage container casing 10. For this purpose the two apertures 18 and 20 are arranged on top of storage container casing 10. A perforated metal sheet 90 is inserted shell-like between storage container casing 10 and separating diaphragms 22 and 24. Partial chambers 32, 32a and 34, 34a are then formed. The rigid perforated metal sheet 90 can also be configured of a special fluid-permeable, preferably inelastic layer (chamber 32a and 34a), without the function being negatively influenced. With the principle which is demonstrated, a dosing storage container can be realized which can assume any desired assembly arrangement, without the assembly or its position influencing the operation, since accumulation of air volumes in the fluid chamber is avoided quite certainly in any such assembly.

If the predeterminable volume of inside chamber 30 is to be modified, a balloon can be inserted therein, which according to its level of filling can more or less fill up partial chamber 30. The described separating diaphragms need not be of elastic material, if they can pass on pressures which arise. Thus, these could also be formed of sheet metal materials, known from aneroid flowmeters or the like.

While various embodiments have been chosen to illustrate the invention, it will be understood by those skilled in the art that various changes and modifications can be made therein without departing from the scope of the invention as defined in the appended claims.

I claim:

1. A toilet flushing system, comprising:

a toilet;

a fresh water feed;

a fluid storage container connected to said fresh water feed, said fluid storage container having a container casing and first and second separating diaphragms within said container casing, said separating diaphragms defining first, second and third partial chambers within said container casing, said second partial chamber being defined between said separating diaphragms and receiving a pressurized fluid;

a supply line coupled to said storage container and said toilet; and valve means, in said fresh water feed and said supply line, for selectively coupling said fresh water feed and said supply line to said first partial chamber, said valve means being movable between a first switch position for filling said first partial chamber with fresh water from said fresh water feed and a second switch position for delivering fresh water from said first partial chamber through said supply line to said toilet and for simultaneously filling said third partial chamber with a fluid.

2. A toilet flushing system according to claim 1 wherein said third partial chamber is coupled through said valve means to a compressed air source for filling said third partial chamber with compressed air.

3. A toilet flushing system according to claim 1 wherein said third partial chamber is coupled through said valve means to a fluid pump for filling said third partial chamber with hydraulic fluid.

4. A toilet flushing system, comprising:

a toilet;

a fresh water feed;

a pressure medium source;

a fluid storage container connected to said fresh water feed, said fluid storage container having a container casing and first and second separating diaphragms within said container casing, said separating diaphragms defining first, second and third partial chambers within said container casing, said first and third partial chambers separately receiving fresh water from said fresh water feed, said second partial chamber being defined between said separating diaphragms and being connected to said pressure medium source for receiving pressure medium;

a supply line coupled to said storage container and said toilet; and valve means, in said fresh water feed and said supply line for selectively coupling said fresh water feed and said supply line to said first and third partial chambers, said valve means being movable between a first switch position for filling said first partial chamber with fresh water from said fresh water feed and simultaneously delivering fresh water from said third partial chamber through said supply line to said toilet and a second switch position filling said third partial chamber with fresh water from said fresh water feed and simultaneously delivering fresh water from said first partial chamber through said supply line to said toilet.

5. A toilet flushing system according to claim 4 wherein each of said separating diaphragms comprises a shell-like configuration with a longitudinal border sealed to said container casing.

6. A toilet flushing system according to claim 4 wherein said fresh water feed includes carrying lines which open into said first and third partial chambers at one end of said container casing; and ventilation lines are connected to said first and third partial chambers at an opposite end of said container casing and to the respective fluid carrying lines.

7. A toilet flushing system according to claim 4 wherein a rigid partition is located between each of said separating diaphragms and said container casing.

8. A toilet flushing system according to claim 4 wherein a rigid separating layer with apertures is located between each of said separating diaphragms and said container casing.

9. A toilet flushing system according to claim 4 wherein said pressure medium is a gas.

* * * * *